(12) United States Patent
Dinkel et al.

(10) Patent No.: US 7,293,495 B2
(45) Date of Patent: Nov. 13, 2007

(54) MOTOR-PUMP UNIT

(75) Inventors: Dieter Dinkel, Schwalbach (DE);
Thomas Bartsch, Niedernhausen (DE);
Sven Martin, Schwetzingen (DE);
Rüdiger Briesewitz, Bruchkoebel (DE);
Axel Niescher, Frankfurt (DE)

(73) Assignee: Continental Teves AG & Co. oHG (DE)

( * ) Notice: Subject to any disclaimer, the term of this patent is extended or adjusted under 35 U.S.C. 154(b) by 355 days.

(21) Appl. No.: 10/534,172

(22) PCT Filed: Nov. 6, 2003

(86) PCT No.: PCT/EP03/12363

§ 371 (c)(1),
(2), (4) Date: May 6, 2005

(87) PCT Pub. No.: WO2004/044427

PCT Pub. Date: May 27, 2004

(65) Prior Publication Data

US 2006/0056995 A1    Mar. 16, 2006

(30) Foreign Application Priority Data

Nov. 11, 2002 (DE) .................................. 102 52 622

(51) Int. Cl.
*F01B 1/00* (2006.01)

(52) U.S. Cl. ................................ 92/86; 92/72; 417/415

(58) Field of Classification Search .................... 92/72, 92/86, 129; 417/415
See application file for complete search history.

(56) References Cited

U.S. PATENT DOCUMENTS

| 5,620,311 | A | | 4/1997 | Wetzel | |
|---|---|---|---|---|---|
| 5,742,109 | A | * | 4/1998 | Volz et al. | ..................... 310/89 |
| 5,839,349 | A | * | 11/1998 | Volz | ............................. 92/129 |
| 6,478,554 | B1 | * | 11/2002 | Dinkel et al. | ................... 92/86 |
| 2004/0045431 | A1 | * | 3/2004 | Schmitt et al. | ................ 92/129 |

FOREIGN PATENT DOCUMENTS

| DE | 199 22 297 A1 | 11/2000 |
|---|---|---|
| DE | 199 27 658 A1 | 12/2000 |
| DE | 100 23 947 A1 | 11/2001 |
| DE | 100 45 619 C1 | 5/2002 |
| GB | 2 349 922 A | 11/2000 |
| GB | 2 351 125 A | 12/2000 |
| GB | 2 367 780 A | 4/2002 |
| WO | WO 00/03902 | 1/2000 |
| WO | WO 02/060734 A1 | 8/2002 |

* cited by examiner

*Primary Examiner*—Michael Leslie
(74) *Attorney, Agent, or Firm*—RatnerPrestia

(57) ABSTRACT

The invention relates to a motor-pump unit for a motor vehicle brake system, comprising a motor and a pump which is provided with a shaft that is driven by said motor, with the shaft end being rotatably mounted by means of at least one bearing in an accommodating member having valves and connecting channels, said shaft driving displacement means which are disposed in a chamber that can be filled with pressure fluid. In order to improve vacuum filling of the brake system with pressure fluid, the invention discloses that the shaft end terminates into a free space, and that at least one connection is provided between the free space and the chamber.

12 Claims, 3 Drawing Sheets

MOTOR-PUMP UNIT

TECHNICAL FIELD

The present invention relates to a motor-pump unit for a motor vehicle brake system, comprising a motor and a pump which is provided with a shaft that is driven by said motor, with the shaft end being rotatably mounted by means of at least one bearing in an accommodating member having valves and connecting channels, said shaft driving displacement means which are disposed at least in part in a chamber that can be filled with pressure fluid and in which the bearing runs at least in part, and with the shaft end terminating into a free space.

BACKGROUND OF THE INVENTION

A motor-pump unit of this type is disclosed in DE 199 27 658 A1. In general, a motor vehicle brake system is filled with the necessary pressure fluid after the assembly of the individual system components such as in particular a master brake cylinder, a tube and hose line system, the motor-pump unit and wheel brakes at the vehicle manufacturer's premises. For this purpose, the entire brake system is evacuated in a first process step, while the pressure fluid provided is introduced in a second process step.

It has shown that roller bearing assemblies of motor-pump units are exposed to high stress, which is untypical of roller bearings, in particular during the pressure fluid filling process. Due to an alternate application with vacuum or excess pressure, respectively, it may e.g. occur in sealed roller bearings that sealing elements such as sealing lips are detached. This fact, in turn, can cause lubricants to be washed out and, consequently, can lead to a reduced lifetime of the pump. The bearings will fail prematurely what is problematic in particular in brake systems with long pump operating times as is the case in electrohydraulic brake systems in particular. Bearings, which are not sealed, provide a free access to the roller surfaces and do not allow using a special lubricant. This entails problems when the lubricating properties of the pressure fluid used are not appropriate, or when the pressure fluid contains wear particles that can cause damage to the running surfaces.

BRIEF SUMMARY OF THE INVENTION

An object of the invention is to provide an improved motor-pump unit where the risk of bearing damages and the washout of lubricants from bearings is reduced.

According to the invention, this object is achieved because the bearing separates the chamber from the free space, and because a connection is provided between the chamber and the free space which acts quasi as a bypass circumventing the interior of the roller bearing so that it neither must be feared that lubricants are washed out, nor that sealing means are damaged. The result is that sealed roller bearings can be used, which are protected against washouts of lubricants. A quick and, hence, low-cost pressure fluid filling process is rendered possible nevertheless.

In a favorable embodiment of the invention, the free space and the chamber are destined to receive pressure fluid, in particular to receive leakage pressure fluid, and there is further provision of a channel between a pressure fluid supply tank and the chamber so that the free space can be connected to the pressure fluid supply tank especially for filling purposes. With long pump operating times, it is therefore rendered possible to return the leakage pressure fluid, which successively accumulated in the chamber and the free space, into the pressure fluid supply tank and, thus, into the brake system.

In another favorable embodiment of the invention, the bearing is configured as a movable bearing in such a fashion that the connection between free space and chamber takes place by way of a slot between an inner bearing ring and a seat of the roller bearing. This obviates the need for making any special provisions to establish the connection.

In another embodiment of the invention, the connection is designed as a channel, with the channel's wall consisting of circumferential areas of inner ring and the bearing seat. The channel may principally have any cross-section desired and allows the mentioned connection at a defined location.

When the bearing seat has at least one flattened region for forming the channel, said flattened region is simple to produce by a metal-cutting operation during manufacture of the shaft. This fact avoids bypass bores at the housing end. The mounting space thereby saved in the housing can be used for other purposes.

When the shaft includes an eccentric for driving at least one pump piston, the maximum of the eccentricity and the channel are arranged substantially in alignment with each other with regard to an axial direction. The surface pressure on the inner bearing ring is reduced due to this arrangement because the channel will not reduce the abutment surface available.

According to the invention, the bearing is arranged in a stepped through-hole of the accommodating member, with the bearing adjoining the free space, and the through-hole and the free space being provided with a closure means. Manufacturing a through-hole is simple compared to manufacturing a blind-end bore and, in addition, allows supporting the shaft end when mounting a bearing close to the motor.

The closure means is preferably designed as a cover that abuts on a bore step, with said cover being calked with the accommodating member. The cover can be a deepdrawn or molded part, and the calking at the housing also reduces the costs of manufacture. Principally, a tool-free clinching engagement between the cover and the accommodating member is possible without departing from the spirit of the invention. In this respect, provision must be made to ensure that the cover includes an appropriate profiling and is made of a harder material than the accommodating member.

Another solution of the above-mentioned problem can be taken from an alternative independent claim. The motor-pump unit comprises a driving motor shaft, which is mounted by means of at least one bearing so as to be rotatable in the accommodating member. The bearing is interposed between an end plate of the motor and the crank chamber. The shaft drives displacement means reaching up to the crank chamber. The above-mentioned problem is solved by providing at least one channel linking a side of the bearing remote from the crank chamber to a leakage discharge channel for the crank chamber.

A favorable design of the embodiment disposes of a channel provided in the accommodating member. The leakage volume that can be received is further increased because the channel opens into a chamber that is delimited by the end plate and the accommodating member, said chamber being connected to the leakage discharge channel.

DETAILED DESCRIPTION OF THE PREFERRED EMBODIMENTS

Figure 1:
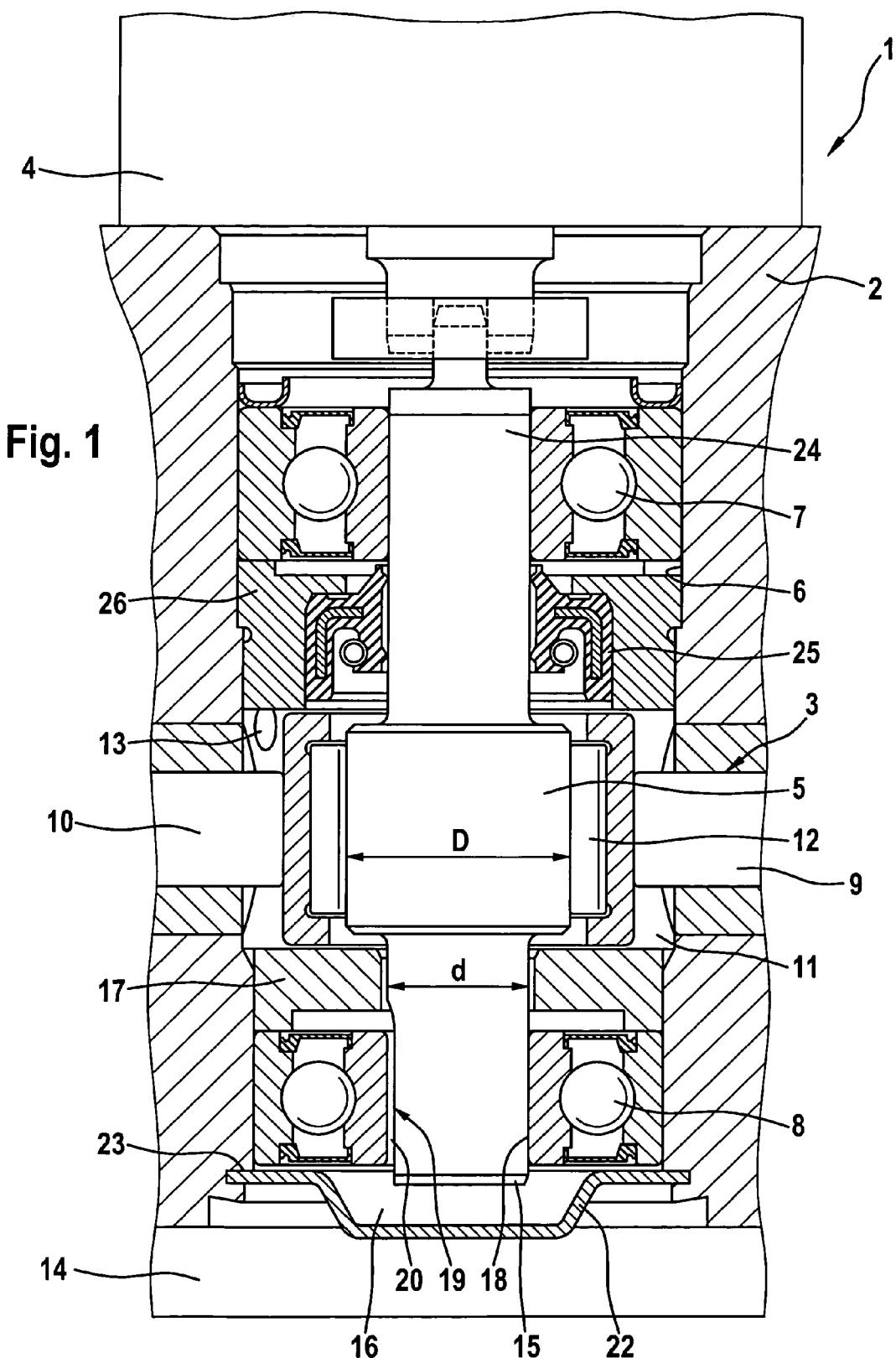
FIG. 1 is a cross-sectional enlarged view of an embodiment of a motor-pump unit.

A motor-pump unit 1 for application in a motor vehicle brake system is connected to wheel brakes (not shown), on the one hand, and to a generator (not shown) such as a master brake cylinder with a pressure fluid supply tank, on the other hand. An accommodating member 2 comprises at least six hydraulic connections for this purpose. The unit is especially appropriate and destined for electrohydraulic brake systems being equipped with a high-pressure accumulator integrated at or in the accommodating member 2 and used to feed the wheel brakes. In this arrangement, the master brake cylinder is only used for the braking operation in a case of emergency and primarily serves for the simulation of brake application forces.

The motor-pump unit 1 further comprises a pump 3 for feeding the high-pressure accumulator or for feeding wheel brakes and a motor 4 for driving the pump 3. An electronic unit 14 for controlling and regulating the system is positioned on a side of the accommodating member 2 opposite the motor 4, and electronic control and supply lines of the motor 4 extend through the accommodating member 3.

Motor 4 drives a pump shaft 5, which is rotatably mounted within a stepped through-hole 6 by means of sealed bearings 7, 8. Bearing 7 is designed as a fixed bearing, while bearing 8 is designed as a movable bearing and, therefore, cannot accommodate axial forces. Pump shaft 5 acts on displacement means for the pressure fluid. The illustrated preferred embodiment relates to a radial piston pump wherein the displacement means are pump pistons 9, 10 terminating into a chamber 11 that is arranged roughly centrically between the bearings 7, 8 and being driven by an eccentric connected to the shaft (not shown in the drawings). The number of pump pistons is principally optional, with three pistons being preferred because this minimizes pulsations and noise development. A roller bearing 12, in particular a needle bearing is interposed between the eccentric and pump pistons 9, 10 for the purpose of friction reduction. In order to return e.g. pressure fluid which has collected due to inside leakage in chamber 11 to the system again, (or when the chamber 11 is anyway flooded with pressure fluid), a channel 13 being connected to the pressure fluid supply tank opens into chamber 11. A shaft end 15 remote from the motor reaches up to a free space 16 and penetrates a bottom 17 that is inserted into the through-hole 6 and abuts axially on an outer ring of bearing 8. A slot is disposed between shaft 5 and a through-hole through the bottom 18 for the passage of pressure fluid. An inner ring of bearing 8 is arranged in a sliding fit on a shaft-end bearing seat 18, and a connection 19 is established between chamber 11 and free space 16. According to the embodiment, the connection is configured as channel 20, its wall being composed of circumferential areas of inner ring and bearing seat. To form the channel 20, the bearing seat 18 has a flattened region 21, while the inner ring is annular as before so that a sickle-shaped, free channel cross-section prevails between these adjacent components for the pneumatic evacuation and the passage of pressure fluid. Eccentricity and channel 20 are in axial alignment with each other for a bearing seat as good as before, what can be taken from FIG. 2. More specifically, the flattened region 21 substantially adopts the same angular position as does the eccentric maximum (maximum stroke), as becomes apparent from the dash-dot line in FIG. 2. Because the maximum bearing forces in the displacement stroke are plotted on the side opposite to the eccentric maximum (as viewed from the inner bearing ring), the effective force-transmitting surface at the bearing seat is not reduced in spite of channel 20. Damages to the bearing seat are thereby avoided.

The flattened region 21 can principally be replaced by the provision of bores that extend through the interior of the shaft.

As can be taken from FIG. 1, the free space 16 includes a closure means 22 configured as a cover and preventing the loss of pressure fluid on the side of the electronic unit 14. The cover is placed on a bore step 23 of the through-hole 6 and calked with the accommodating member 2 in fluid-tight and gas-tight manner. For the purpose of sealing the chamber 11, a sealing element 25 is provided between eccentric and bearing 7 in the area of the motor-sided shaft end 24, said sealing element being arranged in a retaining member 26, whereby leakage fluid is prevented from propagating out of the accommodating member 2 in the direction of motor 4.

Figure 3:
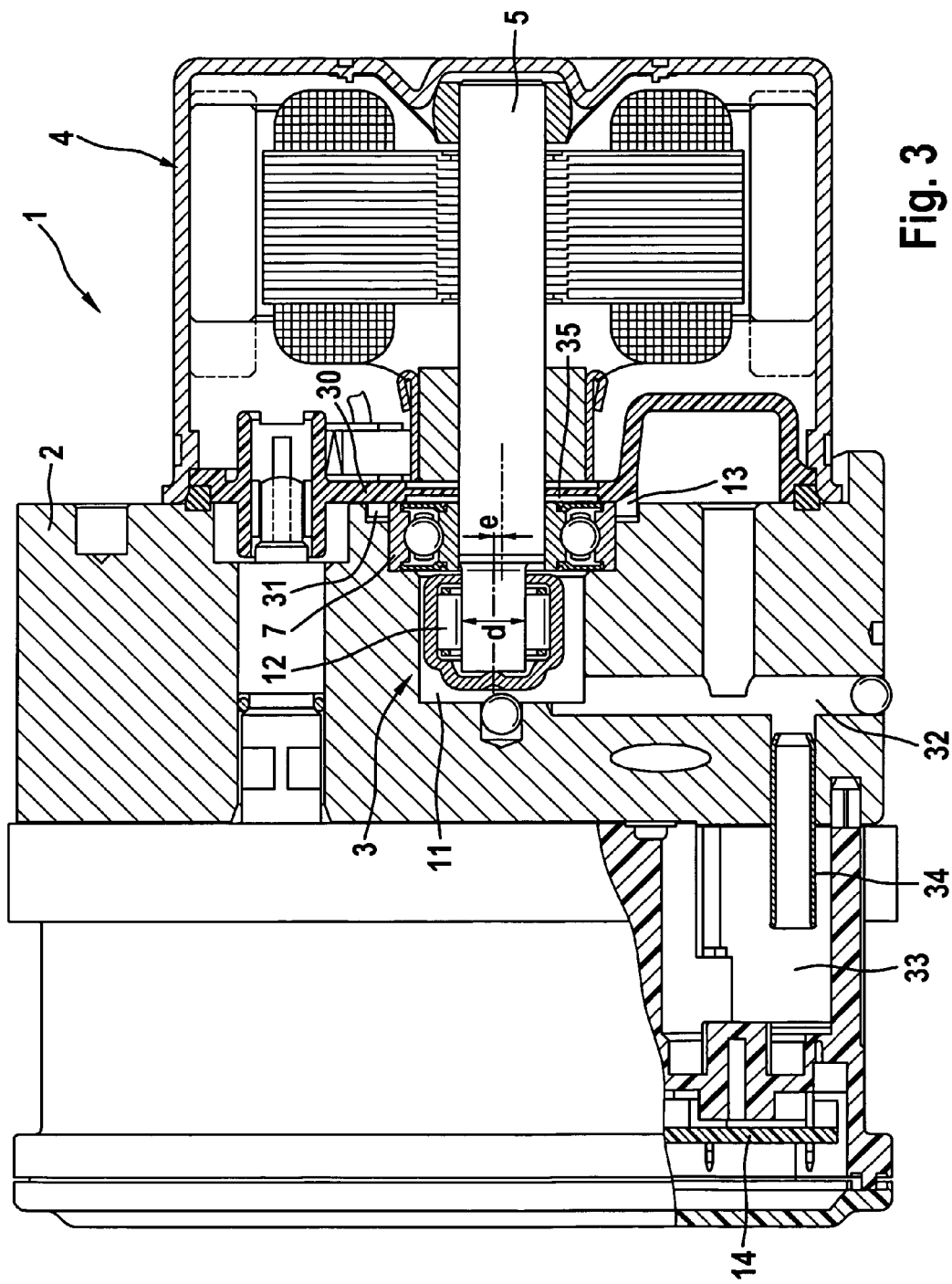
FIG. 3 shows a solution where a side of a bearing that is remote from the crank chamber is in connection to a leakage discharge channel by way of a channel.

FIG. 3 exhibits an embodiment according to another solution in a so-called 'cantilever' bearing with a freely overhanging shaft end. A 'cantilever' bearing of this type is widely known in motor-pump units of vehicle brake systems. The prior-art constructions suffer from the shortcoming that alternate heating and cooling processes, in particular of the motor, are quasi able to cause an aspiration operation so that leakage fluid disposed in the crank chamber can propagate due to a difference in pressure into the motor's interior. Damage to the filling of the bearing with lubricants or a washout of lubricants as well as damage to the sealing means of the bearing is possible.

Figure 2:
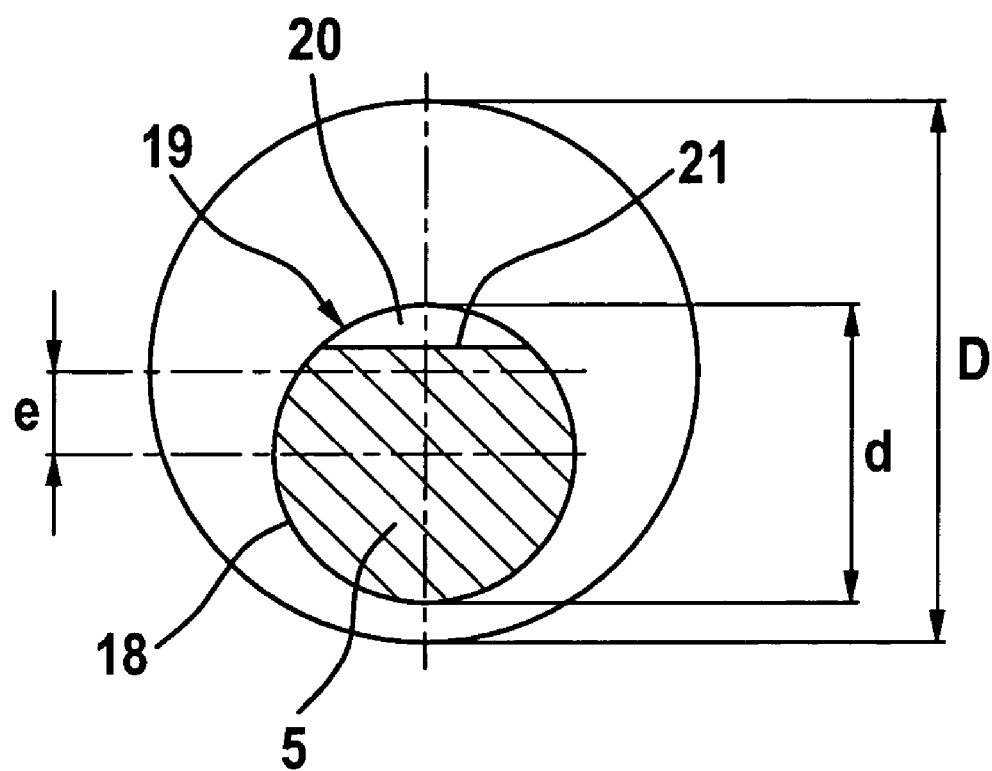
FIG. 2 shows a sketch for schematically illustrating the position of the eccentric and the channel.

Components and features in FIG. 3 that correspond to those in FIGS. 1 and 2 have been assigned identical reference numerals. Repetition of the related description is refrained from, while differences will be referred to in detail in the following. A pump shaft 5 with an eccentric that is arranged in the crank chamber 11 is used as a pump drive. A sealed bearing 7 is used for the mounting support of pump shaft 5, said bearing being provided in front of an end plate 30 of motor 4 between crank chamber 11 and end plate 30. Said end plate 30 is made of a plastic material, closes the bowl-shaped motor housing and carries the sealed bearing 7 provisionally before the final assembly of motor 4 and accommodating member 2 because an annular socket 31 encompasses part of the outer bearing ring.

The crank chamber 11 is connected to a leakage discharge channel 32 which can discharge accumulated leakage fluid into a storage chamber 33 of the unit 33, store it, or discharge it into the ambience. To be able to reliably discharge the leakage fluid into storage chamber 33 within the electronic unit 14 without allowing a return flow of leakage fluid or ambient fluids in the direction of the crank chamber 11, the accumulating member 2 can include a small tube 34 reaching into the storage chamber 33, and an outlet of the small tube 34 is arranged at a distance from the free fluid level.

To prevent in addition that leakage fluid washes out lubricants and can propagate through the sealed bearing 7 or, due to the undermining of bearing seats, into a spacing 35 behind the bearing 7 and from there into the interior of the motor, the side of the bearing 7 remote from the crank chamber is connected to the leakage discharge channel 32 by way of one or more channels 13. To this end, the annular socket 31 comprises one or more channels 13 that extend in the direction of the bearing seat in the end plate 30 remote from the crank chamber so that contact can be made with the spacing 35 disposed between a fire wall of the end plate 30 and the side of the bearing 7 remote from the crank chamber. Each channel 13 connects this side remote from the crank chamber with the leakage discharge channel 32 which discharges leakages fluid that can collect in the crank chamber 11 and the spacing 35 either into the ambience or into the storage chamber 33. The interior of the motor is protected against the ingress of leakage fluid in the area of the shaft's exit due to the described features. Even if leakage fluid propagates through the bearing 7 is it possible to supply it to the anyway provided leakage cycle. The system and in particular the bearing 7 is relieved from pressure under pneumatic aspects due to being linked to the atmosphere. This will prevent leakage fluid or ambient fluid to be pressed through the bearing 7 into the interior of the motor under the effect of a pressure gradient. Besides, it is prevented that washers of the bearing 7 get detached under the effect of a pressure gradient.

Channel 13 may principally also be provided as a partial recess in the accommodating member 2, as can be taken from FIG. 3. Further, channel 13 may principally be provided at an outer bearing ring, what necessitates, however, a separate machining of the standardized component. The channels 13 are provided in the accommodating member 2 in a modified embodiment (not shown).

As can be seen in FIG. 3, it is not imperative that the channel 13 opens directly into the leakage discharge channel 32. The reason is that a chamber can be interposed, which is delimited by the end plate 30 and the accommodating member 2.

In general, the invention allows an extremely compact construction as well as a highly improved protection of the motor 4 against leakage fluid, while remnants of water and/or leakage fluid (brake fluid) within the unit are avoided.

It goes without saying that the invention is applicable with many different types of pumps, which suffer from a so-called inside leakage. The invention is principally also apt for the application in connection with a gear pump including e.g. pairs of internal geared wheels as displacement means.

LIST OF REFERENCE NUMERALS 1 motor-pump unit
2 accommodating member
3 pump
4 motor
5 pump shaft
6 through-hole
7 bearing
8 bearing
9 pump piston
10 pump piston
11 chamber
12 roller bearing
13 channel
14 electronic unit
15 shaft end
16 free space
17 bottom
18 bearing seat
19 connection
20 channel
21 flattened region
22 closure means
23 bore step
24 shaft end
25 sealing element
26 retaining member
30 end plate
31 annular socket
32 leakage discharge channel
33 storage chamber
34 small tube
35 spacing

The invention claimed is:

1. A motor-pump unit for a motor vehicle brake system, comprising a motor and a pump which is provided with a shaft that is driven by said motor, with the shaft end being rotatably mounted by means of at least one bearing in an accommodating member, said shaft driving displacement means which are disposed at least in part in a chamber that is filled with pressure fluid and the chamber surrounding at least a part of the bearing, and with the shaft end terminating into a free space within the accommodating member, wherein the bearing separates the chamber from the free space, and wherein a connection is provided between the chamber and the free space, the connection being a channel with a wall which consists of circumferential areas of an inner bearing ring and a bearing seat of said shaft.

2. Motor-pump unit as claimed in claim 1, wherein the free space and the chamber are designed to receive pressure fluid, particularly leakage pressure fluid.

3. Motor-pump unit as claimed in claim 1, wherein the channel is provided between a pressure fluid supply tank and the chamber so that the free space is connected to the pressure fluid supply tank especially for pressure fluid filling purposes.

4. Motor-pump unit as claimed in claim 1, wherein the bearing seat of said shaft has at least one flattened region that forms the channel.

5. Motor-pump unit as claimed in claim 1, wherein the shaft includes an eccentric for driving at least one pump piston, and wherein the maximum of the eccentricity and the connection are arranged substantially in alignment with each other with regard to an axial direction.

6. Motor-pump unit as claimed in claim 1, wherein the bearing is arranged in a stepped through-hole of the accommodating member, wherein the bearing adjoins the free space, and wherein the through-hole is provided with a closure means.

7. Motor-pump unit as claimed in claim 6, wherein the closure means is designed as a cover that abuts on a bore step, and in that the cover is calked with the accommodating member.

8. A motor-pump unit for a motor vehicle brake system, comprising a motor and a pump which is provided with a shaft that is driven by said motor, with the shaft end being rotatably mounted by means of at least one bearing in an accommodating member, said shaft driving displacement means reaching into a crank chamber, and said bearing is provided in front of an end plate of the motor between the crank chamber and the end plate, wherein at least one channel is connecting a side of the bearing remote from the crank chamber with a leakage discharge channel for the crank chamber, wherein the channel opens into a chamber that is delimited by the end plate and the accommodating member, and wherein the chamber is connected to the leakage discharge channel.

9. Motor-pump unit as claimed in claim 8, wherein the channel is provided in the end plate.

10. Motor-pump unit as claimed in claim 8, wherein the channel is provided in the accommodating member.

11. Motor-pump unit as claimed in claim 8, wherein the channel is provided at an outer ring of the bearing.

12. Motor-pump unit as claimed in claim 8, wherein the bearing includes sealing washers.

* * * * *